July 1, 1941.　　C. D. PETERSON ET AL　　2,247,713
OVERRUNNING CLUTCH WITH FLOATING RACEWAYS Filed Aug. 12, 1938

INVENTORS.
Carl D. Peterson & Albert W. Grimes
BY Bodell & Thompson
ATTORNEYS.

Patented July 1, 1941

2,247,713

UNITED STATES PATENT OFFICE 2,247,713

OVERRUNNING CLUTCH WITH FLOATING RACEWAYS

Carl D. Peterson and Albert H. Deimel, Toledo, Ohio

Application August 12, 1938, Serial No. 224,588

2 Claims. (Cl. 192—45)

This invention relates to over-running or free-wheeling clutches, such as are used in motor vehicles. In the usual free-wheeling clutch, the outer raceway is rigidly tied or coupled at one end with the shaft with which it rotates, this being usually the output shaft. Hence, under load, one end or the other of the raceway being held rigid is prevented from centering or expanding with the result that the load is concentrated on one end or the rollers of the over-running clutch, and also with the result that because of errors and eccentricities, the load tends to concentrate on one roller, causing a heavy radial load which is transferred to the bearings supporting the driving and driven elements or shafts of the clutch.

The general object of this invention is a coupling between one of the raceways and the element or shaft with which it rotates, which coupling permits a radial or self-centering movement of the raceway relatively to the other raceway, the rollers and the element or shaft with which the self-centering raceway rotates.

More specifically, it has for its object a floating coupling in the form of a collar having teeth or splines slidably interfitting with more or less looseness in teeth or splines on one of the raceways and the element or shaft with which it rotates.

The invention consists in the novel features and in the combinations and constructions hereinafter set forth and claimed.

In describing this invention, reference is had to the accompanying drawing in which like characters designate corresponding parts in all the views.

Figure 1:
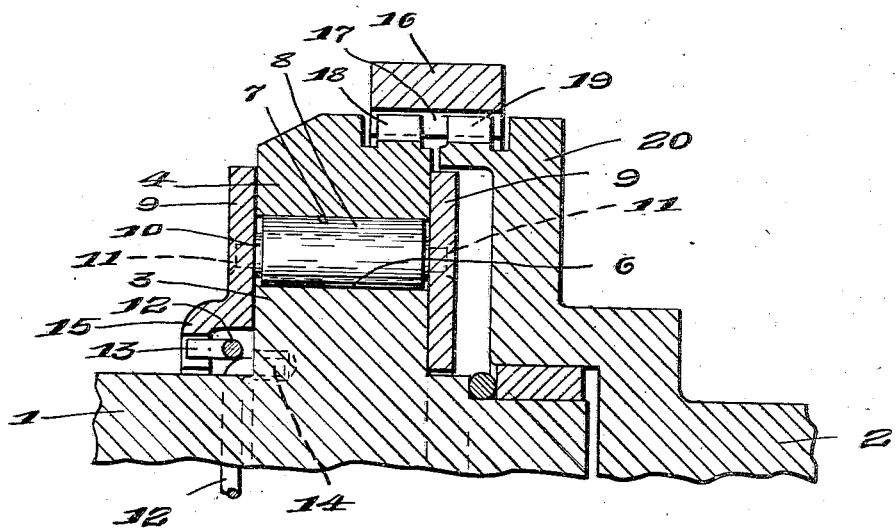
Figure 1 is a fragmentary sectional view of an over-running or free-wheeling clutch embodying this invention.
Figure 2:
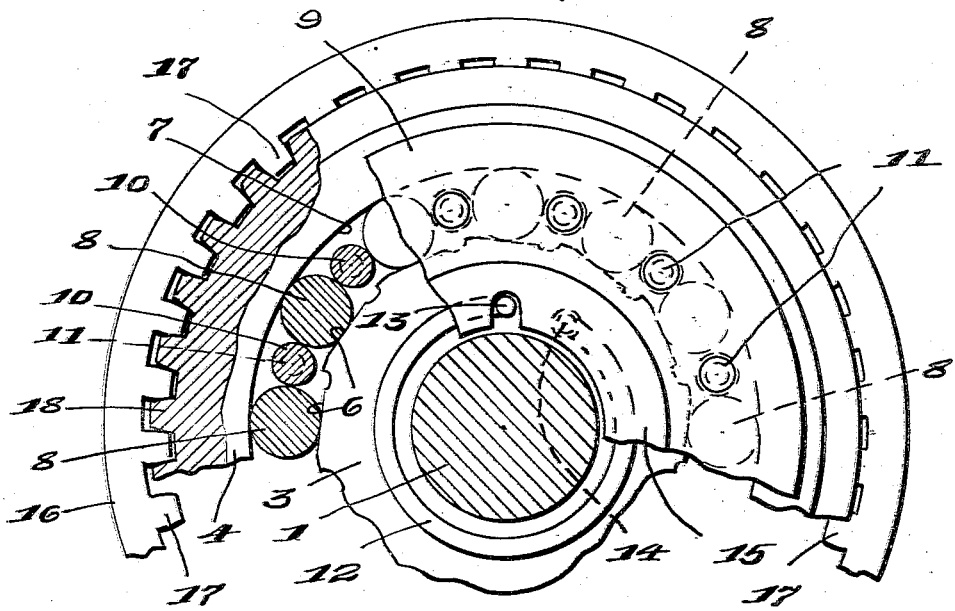
Figure 2 is a fragmentary end elevation of parts seen in Figure 1.

This over-running clutch includes opposing raceways, and an annular series of rolling members between the raceways, one of the raceways being formed with cam surfaces for coacting with the rolling members and a floating coupling flexibly connecting one of the raceways and the element or shaft with which it rotates to permit relative radial self-centering movement of that raceway and the element with which it rotates, and the other raceway and series of rollers.

In the illustrated embodiment of the invention, the over-running clutch is of the type including inner and outer raceways with annular series of rolling members, usually rollers, between the raceways. The raceways are rotatable with driving and driven elements connected together by the clutch.

1 designates a driving element or shaft; 2 a driven element or shaft, these being arranged in axial alinement. 3 and 4 designate respectively inner and outer raceways rotatable respectively with the driving and driven elements. The raceway 3 is here shown as rigid with the driving element 1 and as provided with peripheral cam surfaces 6 and the outer raceway 4 with a smooth internal cylindrical surface 7.

8 designates an annular series of rollers, one roller for each cam surface 6. These rollers are held in position in any well known manner, as by a suitable cage 9, and the cage is here illustrated as also formed as a shroud abutting against the end faces of the raceways 3, 4. The rollers 8 are here shown as located between spacers 10 which are mounted between opposing sides or heads of the cage and riveted at 11 or otherwise secured thereto. Suitable spring means are preferably provided tending to turn the cage 9 in such direction as to force the rollers up the inclines of the cam surfaces, so as to cause the raceways 3, 4 to be clutched smoothly through the rollers with no or with a minimum of looseness, lost motion, or chucking, when the raceway 4 ceases to free-wheel or over-run. As here shown, this means consists of a spring 12 acting on the cage and tending to rotate the cage in a retrograde direction to carry the rollers up the inclines of the cam down which they have been rolled by the over-running action of the raceway 4. The spring is here shown as a single turn of wire around the shaft 1 and anchored at 13 at one end to one head of the cage 9 and at its other end at 14 to the shaft 1. It is housed in a hub 15 on the adjacent head of the cage. The rollers and the raceways, however, may be located or held in position in any suitable manner.

The coupling for flexibly connecting one of the raceways and the element with which it is rotatable, to permit radial self-centering movement is, in the illustrated embodiment of the invention, interposed between the outer raceway 4 and the driven element 2, and comprises a floating collar 16 having internal annular teeth or splines 17 which slidably interfit, with more or less looseness, with the annular series of peripheral teeth 18 and 19 provided on the outer raceway 4 and on a flange 20 on the driven element 2. By reason of the floating collar, one of the raceways is permitted to float radially with respect to the other raceway, and hence to center one raceway with the other and the strain is distributed equally throughout the annular series of rollers, rather than concentrated or located on one or two rollers.

By reason of the floating collar or flexible coupling 16, one of the raceways, as, in this embodiment of the invention, the outer raceway 4, is free to shift and center itself on the rollers 8, both when the free-wheeling clutch is transmitting power, and when it is over-running.

What we claim is:

1. The combination with alined driving and driven elements; of an overrunning clutch connecting said elements and including opposing raceways rotatable respectively with said elements, and an annular series of rolling clutch members between the raceways, one of the raceways and the element with which it rotates being substantially non-overlapping, and a coupling member connected to said raceway and also to the element with which it is rotatable, by splines interengaging with said one of the raceways and the element with which it is rotatable, said interengaging splines coacting with looseness to permit relative radial self-centering movement of the said raceway and to compensate for misalinement of said elements.

2. The combination with axially alined driving and driven elements; of an overrunning clutch connecting said elements and comprising raceways rotatable respectively with said elements, and an annular series of rolling clutch members between the raceways, the outer raceway having an annular series of teeth and the element with which the outer raceway rotates having a similar series of teeth, said outer raceway and the element with which it rotates being substantially non-overlapping, and a floating collar around the two series of teeth and having teeth slidably and loosely interfitting therewith to permit self-centering and universal joint action of the outer raceway and to compensate for misalinements between the outer raceway and the element to which it is connected by the floating collar.

CARL D. PETERSON.
ALBERT H. DEIMEL.